United States Patent [19]
Schild

[11] 3,936,168
[45] Feb. 3, 1976

[54] FILM CAMERA

[75] Inventor: Josef Schild, Vienna, Austria

[73] Assignees: Karl Vockenhuber; Raimund Hauser, both of Vienna, Austria

[22] Filed: Nov. 12, 1973

[21] Appl. No.: 415,128

[30] Foreign Application Priority Data
Nov. 13, 1972 Austria.............................. 9623/72

[52] U.S. Cl. ................ 352/209; 352/152; 352/207
[51] Int. Cl.²......................................... G03B 9/10
[58] Field of Search ........... 352/152, 153, 154, 207, 352/209

[56] References Cited
UNITED STATES PATENTS

| | | | |
|---|---|---|---|
| 1,700,513 | 1/1929 | Porter | 352/209 |
| 1,800,088 | 4/1931 | Debrie | 352/209 |
| 1,949,455 | 3/1934 | Dina | 352/209 |
| 2,941,445 | 6/1960 | Kuhnert | 352/209 |
| 3,135,157 | 6/1964 | Thevenaz | 352/209 X |
| 3,248,166 | 4/1966 | Reinsch | 352/207 X |

*Primary Examiner*—Monroe H. Hayes
*Attorney, Agent, or Firm*—Ernest G. Montague; Karl F. Ross; Herbert Dubno

[57] ABSTRACT

A cine camera having a rotary or reciprocating shutter driven by a motor is provided with a supplementary diaphragm which cooperates with the shutter during acceleration of the motor to its rated speed to reduce the effect on the first film frame or frames of the change in exposure time occurring during the acceleration period of the motor.

4 Claims, 7 Drawing Figures

3,936,168

FILM CAMERA

FIELD OF THE INVENTION

My present invention relates to a film camera having a motor-driven shutter which periodically intersects an optical path extending from a camera lens to a position of a film in the camera. More particularly the invention is concerned with compensating for the temporary slight increase in exposure time which occurs during the period that the motor is accelerating up to its running speed.

STATE OF THE ART

The German Pat. No. 1,259,698 discloses a way of producing the necessary compensation by switching on and off an equalizing device which is controlled in dependence on the rotational speed of the camera motor by a centrifugal system. The equalizing device cooperates with an exposure meter which is incorporated into the camera, so that light incident on the camera lens and deflected by a silvered shutter onto a light-sensitive element is temporarily attenuated to such a value that the quantity of light to which the film is exposed when the shutter is stationary is equal to the average quantity of light which falls on the film over a full cycle of the moving shutter. A disadvantage of this construction is that exposure irregularities are equalized via the optical path of the measuring system when the film starts. Two separate control functions are therefore necessary in order to obtain the desired equalization, namely metering the light beam for the measuring system in dependence on the rotational speed of the shutter diaphragm and resetting an aperture of an iris diaphragm according to the output response of the light-sensitive element. It is evident that slight inaccuracies in control based on such fine measurements lead to very poor results.

A better solution to the problem is proposed in German Pat. No. 1,135,288 where a lens diaphragm controlled by a light-sensitive element is closed by approximately one more stop when stationary than is the case when the camera is operating under the same light conditions but with the shutter-drive motor running at rated speed. However, adjustment of the amount of light which impinges on the film to the correct value is effected indirectly, namely via the light-sensitive element, so that measurement of this amount is relatively complicated.

OBJECT OF THE INVENTION

An object of the invention is to provide a simple way of reducing the effect of the initial acceleration of a shutter-drive motor on the exposure time of the first frame or frames shot with a cine camera.

SUMMARY OF THE INVENTION

In accordance with the present invention a camera having a film position, an objective lens, a shutter, and a motor connected to drive the shutter is provided with a supplementary diaphragm movable between a first position, at which the light incident at the film position is partially restricted by this diaphragm, and a second position at which the light is not restricted by it. The camera further includes motor-driven means producing an inertial force which moves the diaphragm progressively from its first position to its second position during acceleration of the motor to its operating speed.

An advantage of the invention is that the amount of light which traverses the lens in starting the motor is determined directly by the supplementary diaphragm and is not the result of a calculated value determined from the reading of the exposure meter when the camera starts. It is therefore immaterial whether the shutter is of the sliding rotary or pivoting type it is merely essential that the supplementary diaphragm extends beyond the periphery of the shutter-diaphragm blade which covers the image window when the associated drive motor is stationary. When the camera motor accelerates and therefore the shutter movement starts, the supplementary diaphragm at first lengthens the relative period of obstruction of the light path during at least an initial operating cycle of the shutter body and is then progressively retracted by inertial forces into a position in which it does not influence the dark period of the film determined by the shutter blade. The progressive movement of the supplementary diaphragm with respect to the shutter is usually completed after one or two revolutions of the motor-driven shutter.

PREFERRED FEATURES

A simple way of carrying out the invention is for the supplementary diaphragm to be constructed in angular form with two inclined arms merging at an apex which is pivotably supported on the driven shutter. One arm of the supplementary diaphragm projects into the light path of the lens system when the diaphragm is in its first position while the second arm is influenced by a member which is displaced by centrifugal force as the driven shutter gathers speed.

The camera may be provided with a cup shutter which is silvered and reflects the incident light from the objective, onto a photo-electric transducer. In this case it is necessary to compensate for the amount of light which directly impinges on the film as well as the amount of light which strikes the transducer while the cup shutter is accelerating from its stationary state to its specified rotational speed. This compensation may be achieved by providing the supplementary diaphragm with a zone which is disposed in front of an image window of the camera when the cup diaphragm is stationary and which acts to reduce reflected radiation. This zone is advantageously constructed as a screen diaphragm.

BRIEF DESCRIPTION OF THE DRAWING

These and other features of my invention will now be described in more detail, by way of example, with reference to the accompanying drawing, in which.

SPECIFIC DESCRIPTION

I shall describe only the parts necessary to an understanding of the invention; other parts, not illustrated, are conventional and well known per se.

Figure 1:
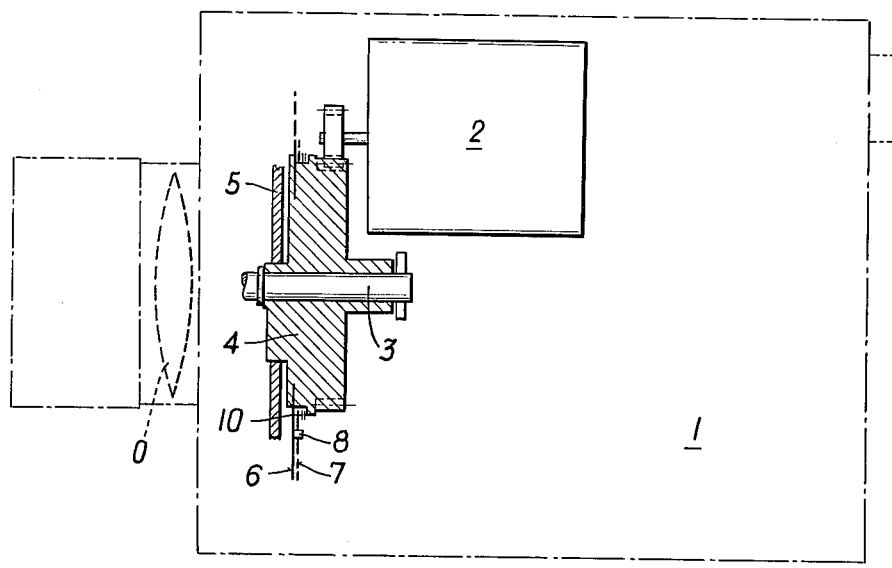
FIG. 1 is a diagrammatic side view of a camera showing, partly in section, the components thereof with which the invention is concerned; in section and block outline.
Figure 2:
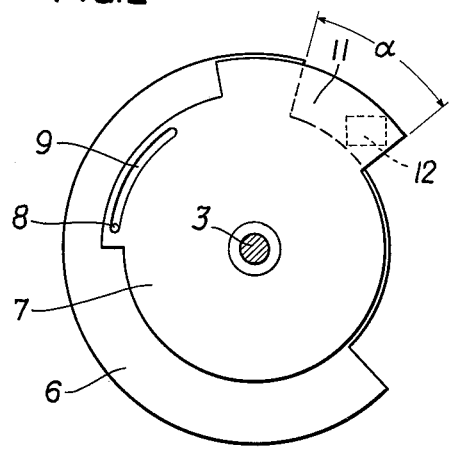
FIG. 2 is a view of a motor-driven rotary shutter and an associated supplementary diaphragm used in the camera of FIG. 1 and as viewed from the left of that Figure.

FIGS. 1 and 2, show a driven rotary shutter 6 mounted adjacent to a claw cam 4 actuating a traction claw 5 on a claw spindle 3 which is driven by a camera motor 2 in a film camera 1. The shutter 6 is associated with a supplementary diaphragm 7 (FIG. 2) which is also supported on the claw spindle 3 and can be adjusted along an arcuate pin-slot guide 8, 9 relative to the position of the shutter 6. To this end a friction spring 10 thrusts the supplementary diaphragm 7 against the shutter 6.

When the camera is stationary, a sector 11 of the supplementary diaphragm 7 extends beyond the perimeter of one blade of the shutter 6 and covers an image window 12 of the camera.

When the camera is started, the shutter 6 driven by the motor 2 rotates in the clockwise direction (FIG. 2), while the supplementary diaphragm 7 and therefore the sector 11 initially remains in front of the image window 12 by virtue of its inertia. Since the supplementary diaphragm 7 is frictionally entrained by the shutter 6, the inertia of the supplementary diaphragm maintains it effective to prolong the exposure time for approximately 1 to 2 revolutions of the shutter 6. When the pin 8 of the driven shutter 6 reaches the leading end (as seen in the direction of rotation) of the arcuate slot 9 of the supplementary diaphragm after these initial revolutions, the two rotation members are positively coupled to each other. At that time the blade 11 which initially projects by an angle $\alpha$ beyond the trailing edge of shutter 6, will have moved into complete register with the shutter 6 and the amount of light which reaches the film is no longer reduced by the supplementary diaphragm acting as an extension of the shutter. Thus the supplementary diaphragm moves through an angle $\alpha$ relative to the driven shutter during the time in which the latter is accelerating to its normal rotational speed.

When picture taking ceases, the inertia of the supplementary diaphragm restores it to its initial position shown in FIG. 2.

Figure 3:
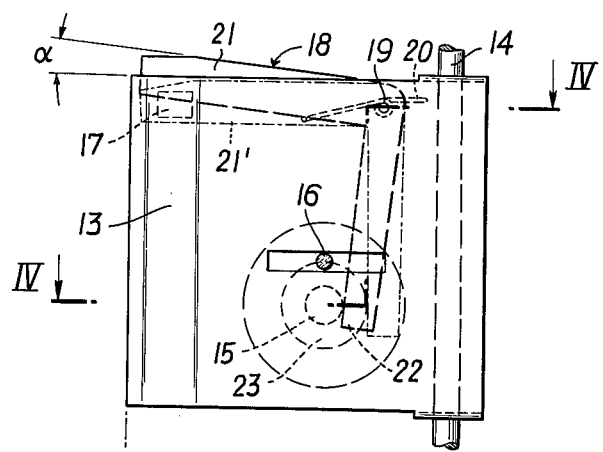
FIG. 3 is a front view of a motor-driven reciprocating shutter and an associated supplementary diaphragm, the latter being shown by full and phantom lines in different working positions.
Figure 4:
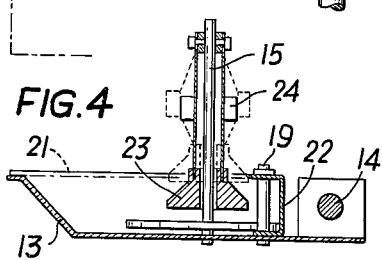
FIG. 4 is a cross-section taken on the line IV—IV of FIG. 3.

In FIGS. 3 and 4 an reciprocating motor-driven shutter 13 slides to and fro along a shaft 14. The shutter 13 is driven from a shutter spindle 15, the vertical reciprocating motion being produced by an eccentric 16 on the spindle 15. An image window 17 is thus intermittently exposed. An angular supplementary diaphragm 18 with two converging arms is supported so as to be pivotable at its apex about a pin 19 on the driven shutter 13 and, when the camera is stationary, is held by a spring 20 in a position in which one member 21 projects by the angle $\alpha$ beyond the periphery of the shutter body. The second arm 22 is disposed in the zone of a cone 23 which is slidable along its axis on the shutter spindle 15 (FIG. 4). The cone 23 is displaceable on the spindle 15 by a centrifugal governor 24 between a static position, shown in full outline, and a dynamic position, shown in phantom outline, in which it frictionally engages one edge on the arm 22.

When the camera starts, the cone 23 is displaced progressively along the spindle 15 by the governor 24 and bears against the edge of the arm 22 of the supplementary diaphragm. Once the rated rotational speed of the shutter spindle is reached, the supplementary diaphragm is swung by the cone 23 in the counter clockwise direction, thus causing the member 21 to move against the bias of spring 20 into its retracted position 21', shown in phantom outline, at which it no longer projects beyond the periphery of the shutter 13. The shutter times for the film are thus again adapted to normal camera operation.

Figure 5:
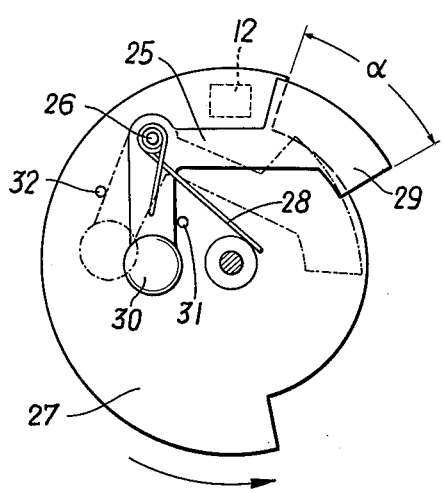
FIG. 5 shows a further form of rotary shutter and an associated supplementary diaphragm, the latter being shown by full and phantom lines in different working positions.

FIG. 5 shows a centrifugally controlled supplementary diaphragm 25 with a motor-driven rotary shutter 27. The supplementary diaphragm 25 is constructed as a bell-crank lever pivoted at 26 to the shutter 27. When the shutter 27 is stationary, a spring 28 maintains one lever arm 29, constructed as a blade, in a position which projects beyond the periphery of the shutter 27 by the angle $\alpha$. The second lever arm 30 is provided with an eccentric weight and is attracted by the spring 28 onto a stop or abutment 31 on the shutter 27 when the latter is stationary. A second step or abutment is provided at 32 on the shutter body.

When the camera is started, the shutter 27 rotates in the counterclockwise direction so that the exposure angle of the first frame of the film is reduced approximately by the angle $\alpha$ in comparison with that of normal operation. As the rotational speed of the shutter 27 increases, the centrifugal force 30 becomes larger than the spring force 28 and the supplementary diaphragm 25 pivots in the clockwise direction as far as the stop 32. The blade 29 is thus moved out of the arcuate aperture of the rotating shutter 27 and retracted into an optically ineffected position.

Figure 6:
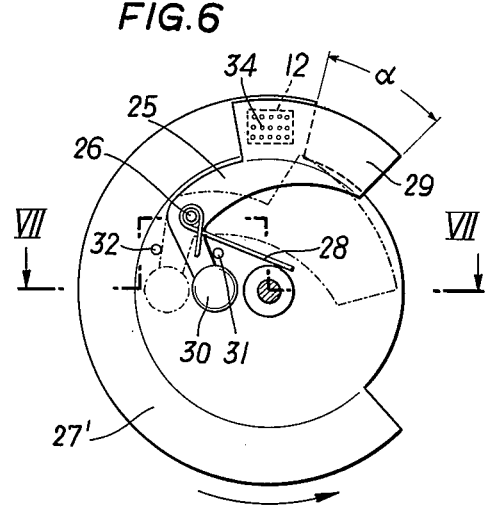
FIG. 6 is similar to FIG. 5 and shows a further rotary shutter and supplementary shutter diaphragm for the camera of FIG. 1.
Figure 7:
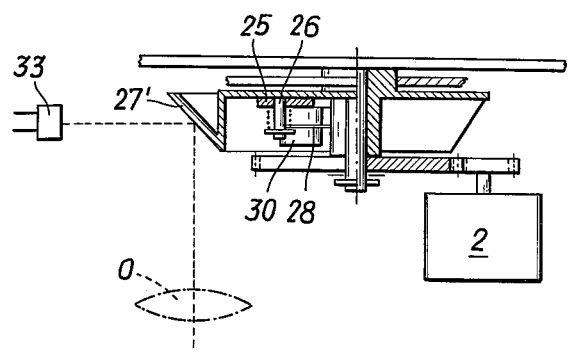
FIG. 7 is a cross-section taken on the line VII—VII of FIG. 6.

A similar device is illustrated in FIGS. 6 and 7, parts having the same function being provided with same reference numerals as those of FIG. 5. The difference is merely that the rotating motor-driven shutter 27' is provided with an arcuate peripheral skirt having a silvered surface by which light incident through a camera-objective lens O is reflected onto a transducer constituted by a photocell 33 when an image window is covered. The blade arm 29 of the supplementary diaphragm 25, held by the spring 28 in the light path of the lens, 0 when the cup-shaped shutter 27' is stationary, is provided with a screen 34 on a skirt-overlapping part 34 so that the amount of light photo cell incident on the photocell 33 can be adapted to the amount of light which impinges at the specified rotational speed. This construction provides compensation not only for the amount of light which is incident on the film when the camera starts but also for the amount of light which is incident on the photocell.

From the foregoing description above of the illustrated embodiments of my invention it will be appreciated that the time during which the supplementary diaphragm is moved out of the light path corresponds substantially to the time during which the shutter-drive motor runs up to speed so that the first image or the first few images of the filmed scene are provided with substantially the same amount of light as the images which are exposed to the image window under normal running conditions.

It should also be noted that in FIGS. 3–7 the supplementary diaphragm embodying my invention is pivotally mounted on the associated shutter body (at an eccentric fulcrum in the case of the rotatable shutters of FIGS. 5-7) and that the light-obstructing portion 21 or 29 of that diaphragm coacts with a working edge of the shutter body 13, 27 or 27', this portion being displaceable by the speed-responsive means 23 or 30 — acting against biasing spring 20 or 28— between an extended position adjacent the working edge and a retracted position offset from that edge.

I claim:

1. A camera having a film position, an objective lens, a shutter, guiding means defining a linear path of reciprocation for said shutter, a motor connected to drive said shutter back and forth along said path, a supplementary diaphragm mounted to reciprocate in unison with said shutter and movable with respect thereto from a first position in which the light incident at the film position is partially restricted by said diaphragm and a second position at which the light is not restricted by said diaphragm, and control means driven rotationally by the motor and creating an inertial force operatively effective to displace the diaphragm progressively from its first position to its second position during acceleration of the motor to its operating speed.

2. A camera as set forth in claim 1, wherein said diaphragm is provided on one arm of a spring-biased bell-crank lever pivoted to the shutter, said lever having its other arm positionally controlled by engaging a control surface arranged to be displaced by a governor responsive to the motor speed.

3. A camera as claimed in claim 1, wherein said controls means comprises a rotary governor driven by a drive shaft of the motor and controlling the axial position on said drive shaft of a cone engaging part of said diaphragm to control its position in accordance with the motor speed.

4. A camera as claimed in claim 1 wherein said motor drives an eccentric and a pin-an-slot linkage between said eccentric and said shutter converts the rotational drive of said motor into reciprocation of said shutter.

* * * * *